(12) United States Patent
Coates et al.

(10) Patent No.: US 7,554,881 B2
(45) Date of Patent: Jun. 30, 2009

(54) DETERMINING SEAWATER CONDUCTIVITY FOR THE COMPENSATION OF ELECTROMAGNETICS-BASED SURVEY DATA

(75) Inventors: Richard T. Coates, Middlebury, CT (US); Steve A. Horne, Lafayette, CA (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/831,093

(22) Filed: Jul. 31, 2007

(65) Prior Publication Data

US 2009/0034365 A1  Feb. 5, 2009

(51) Int. Cl.
*G01L 19/14* (2006.01)
*G01V 1/00* (2006.01)

(52) U.S. Cl. .................... 367/21; 73/432.1
(58) Field of Classification Search ............. 367/21; 73/432.1
See application file for complete search history.

(56) References Cited

U.S. PATENT DOCUMENTS

| | | | | |
|---|---|---|---|---|
| 4,405,036 A | * | 9/1983 | Wener et al. | 181/110 |
| 4,749,254 A | * | 6/1988 | Seaver | 385/12 |
| 4,992,993 A | * | 2/1991 | Chambers | 367/21 |
| 5,579,282 A | * | 11/1996 | Barr | 367/75 |
| 6,681,887 B1 | * | 1/2004 | Kragh et al. | 181/110 |
| 6,751,559 B2 | * | 6/2004 | Fookes et al. | 702/17 |
| 7,340,348 B2 | * | 3/2008 | Strack et al. | 702/14 |
| 7,411,863 B2 | * | 8/2008 | Toennessen | 367/20 |
| 2004/0015618 A1 | * | 1/2004 | Risi et al. | 710/15 |

FOREIGN PATENT DOCUMENTS

FR  2902529 A1 * 12/2007

OTHER PUBLICATIONS

Chave, Constable and Edwards, "Electrical exploration methods for the seafloor," In: *Electrical Exploration Methods in Applied Geophysics*, vol. 2, Chapter 12, pp. 931-966, 1991.
Coppens, "Simple equations for the speed of sound in Neptunian waters," *J. Acoustic Soc. Am.* 69(3):862-863, 1981.
Del Grosso, "New equations for the speed of sound in natural waters (with comparisons to other equations)," *J. Acoustic Soc. Am.*, 56(4):1084-1091, 1974.
Holbrook et al., "Thermohaline fine structure in an oceanographic front from seismic relection profiling," *Science*, 301:821-824, 2003.
Leroy and Parthiot, "Depth-pressure relationships in the oceans and seas," *J. Acoustic Soc. Am.*, 103(3):1346-1352, 1998.

(Continued)

*Primary Examiner*—Andre J Allen
*Assistant Examiner*—Jermaine Jenkins
(74) *Attorney, Agent, or Firm*—Fred G. Pruner; Liangang(Mark) Ye; Jeffrey E. Griffin

(57) ABSTRACT

A technique includes obtaining seismic data, which was acquired during a seismic survey in seawater. The technique includes based on the seismic data, determining a conductivity of the seawater and processing data obtained from an electromagnetics-based survey based on the determined conductivity.

25 Claims, 3 Drawing Sheets

OTHER PUBLICATIONS

MacKay and Fried, "The impact of water-velocity variations on deepwater seismic data," *The Leading Edge*, 22(4):344-350, 2003.

Nandi et al., "Seismic reflection imaging of water mass boundaries in the Norwegian Sea," *Geophysical Research Letters*, 31 (L23311):1-4, 2004.

Páramo and Holbrook, "Temperature contrasts in the water column inferred from amplitude-versus-offset analysis of acoustic reflections," *Geophysical Research Letters*, 32(L24611):1-4, 2005.

Wilson, "Extrapolation of the equation for the speed of sound in sea water," *J. Acoustic Soc. Am.*, 34(6):866, 1962.

Wong and Zhu, "Speed of sound in seawater as a function of salinity, temperature, and pressure," J. Acoustic Soc. Am., 97(3):1732-1736, 1995.

Fofonoff and Millard, "Algorithms for computation of fundamental properties of seawater," *Unesco Technical Papers in Marine Sciences*, 44, 1983.

Mackenzie, "Nine-term equation for the sound speed in the oceans," *J. Acoustic Soc. Am.*, 70(3):807-812, 1981.

* cited by examiner

US 7,554,881 B2

DETERMINING SEAWATER CONDUCTIVITY FOR THE COMPENSATION OF ELECTROMAGNETICS-BASED SURVEY DATA

BACKGROUND

The invention generally relates to determining seawater conductivity for the compensation of electromagnetics-based survey data, such as data acquired by a controlled source electromagnetics survey, for example.

Geological formations that form a reservoir for the accumulation of hydrocarbons in the subsurface of the earth may be characterized by a network of interconnected paths. The network contains the hydrocarbons and allows the ingress of the hydrocarbons to and from the reservoir. Knowledge of the porosity, permeability of geological formations and nature of the pore fluids is typically sought to determine the behavior of the fluids in the network. From this information about porosity, permeability and pore fluid saturation, efficient development and management of hydrocarbon reservoirs may be achieved. For example, the resistivity of geological formations is a function of both porosity and pore fluid type. Considering that hydrocarbons are electrically insulating and most water contains salts, which are highly conductive, resistivity measurements typically are a valuable tool in determining the presence of a hydrocarbon reservoir in the formations.

One innovation in marine hydrocarbon exploration is in the use of controlled source electromagnetics (CSEM). A CSEM survey typically involves towing a horizontal electric dipole source close to the sea floor. Electromagnetic receivers (formed from various combinations of electric field antennae and magnetic field sensors) are situated on the sea floor to detect the electric and magnetic fields that are generated by the electric dipole source so that the fields may be recorded. The recorded fields are subsequently analyzed for purposes of determining the parameters (such as formation resistivity) of the surveyed geological formations.

SUMMARY

In one aspect, a technique includes obtaining, acoustic reflection data, such as seismic data, which was acquired during a seismic survey in seawater. The technique includes determining a conductivity of the seawater based on the seismic data. The technique also includes processing data obtained from an electromagnetics survey based on the determined conductivity.

In another aspect, a system includes an interface to receive seismic data, which was acquired during a seismic survey in seawater. The system further includes a processor that processes the seismic data to determine a conductivity of the seawater.

In yet another aspect, the invention relates to an article that includes a computer accessible storage medium, which stores instructions that when executed cause a processor-based system to obtain seismic data, which was acquired during a seismic survey in seawater. The instructions when executed cause the processor-based system to determine a conductivity of the seawater based on the seismic data.

Advantages and other features of the invention will become apparent from the following drawing, description and claims.

DETAILED DESCRIPTION

Figure 1:
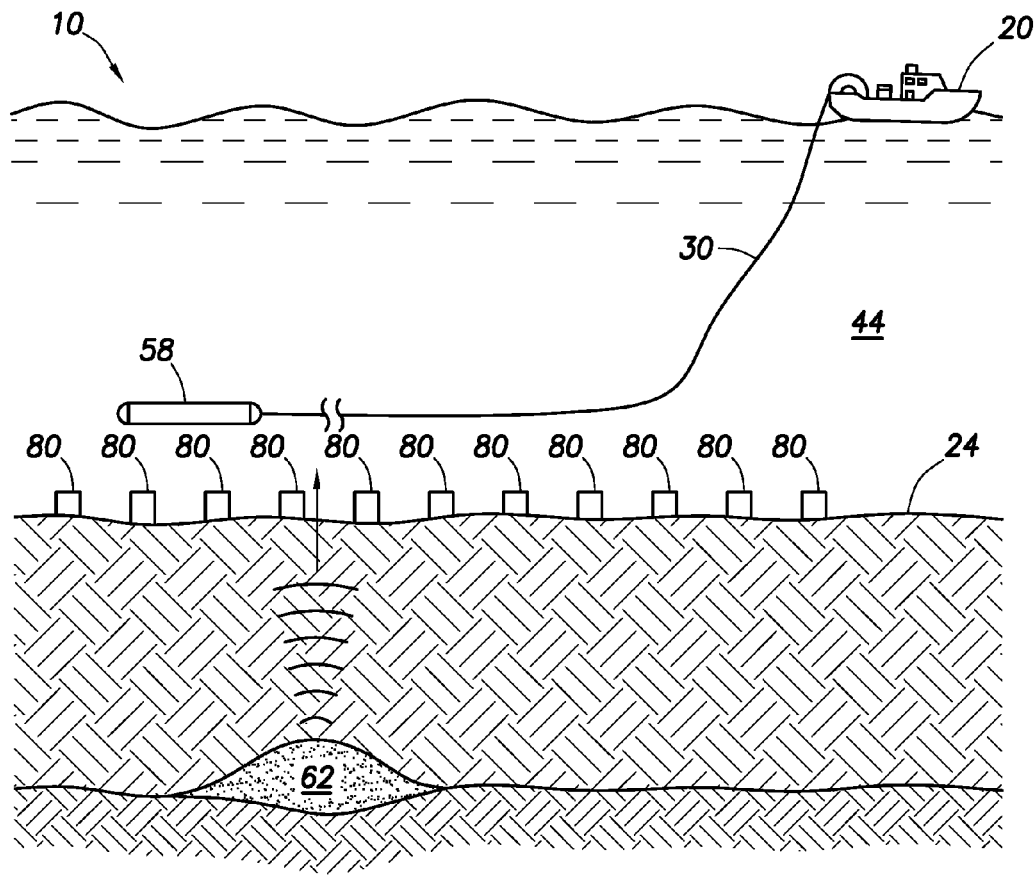
FIG. 1 is a schematic diagram of an example of a marine controlled source electromagnetics (CSEM) acquisition system.

Referring to FIG. 1, as an example, an acquisition system 10 may be used to conduct a controlled source electromagnetics (CSEM) survey. The system 10 includes electromagnetic receivers 80 that are situated on a sea floor 24. A surface vessel 20 tows a horizontal electric dipole source 58 on a cable 30 in seawater 44 in close proximity to the sea floor 24. Activation of the source 58 generates electromagnetic fields that are distorted by variations in the subsurface resistivity distributions 62. These electromagnetic fields are measured using seafloor receivers 80 comprising electric and magnetic fields sensors.

Variations of the vertical seawater conductivity profile as well as lateral and temporal variations in the seawater conductivity may have a significant impact on the fields that are recorded by the receivers 80.

Figure 2:
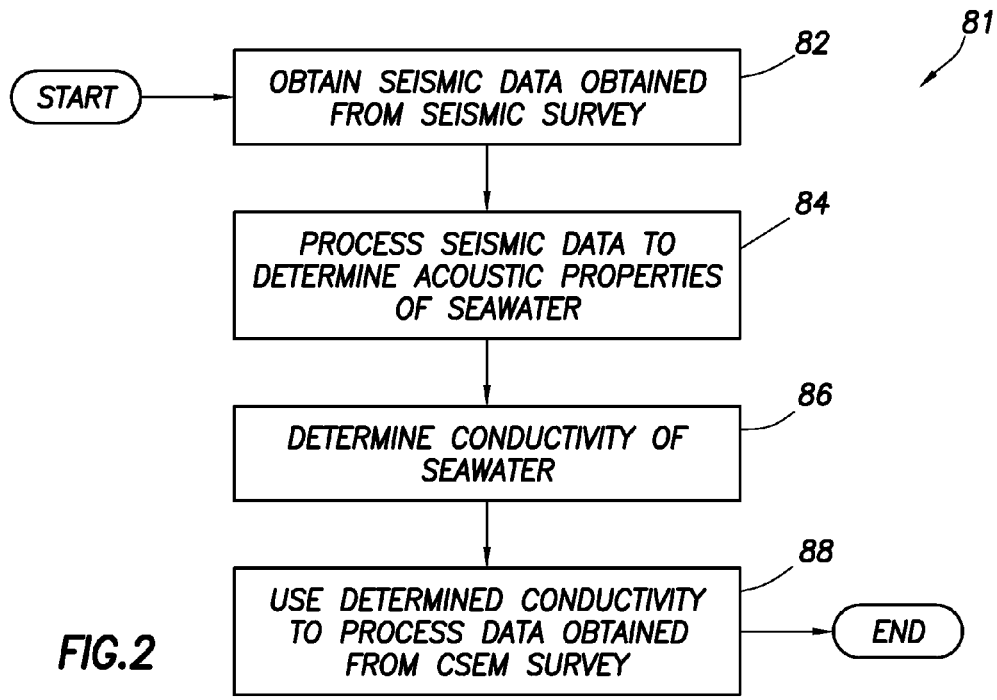
FIGS. 2 and 4 are flow diagrams depicting examples of techniques to determine seawater conductivity and use the determined seawater conductivity to correct CSEM data in accordance with aspects of the present disclosure.

In accordance with examples of systems and techniques that are disclosed herein, seismic data is used to estimate the seawater conductivity so that the estimated conductivity may be used to correct, or compensate for, data that is acquired by the CSEM survey. More specifically, an example of a technique 81 (see FIG. 2) in accordance with the invention includes obtaining (block 82) seismic data that is acquired by a marine seismic survey. The seismic data is processed (block 84) to determine acoustic properties of the seawater. From the acoustic properties, the conductivity of the seawater may be determined (block 86) and subsequently used to process data that was acquired by a CSEM survey, as depicted in block 88.

Figure 3:
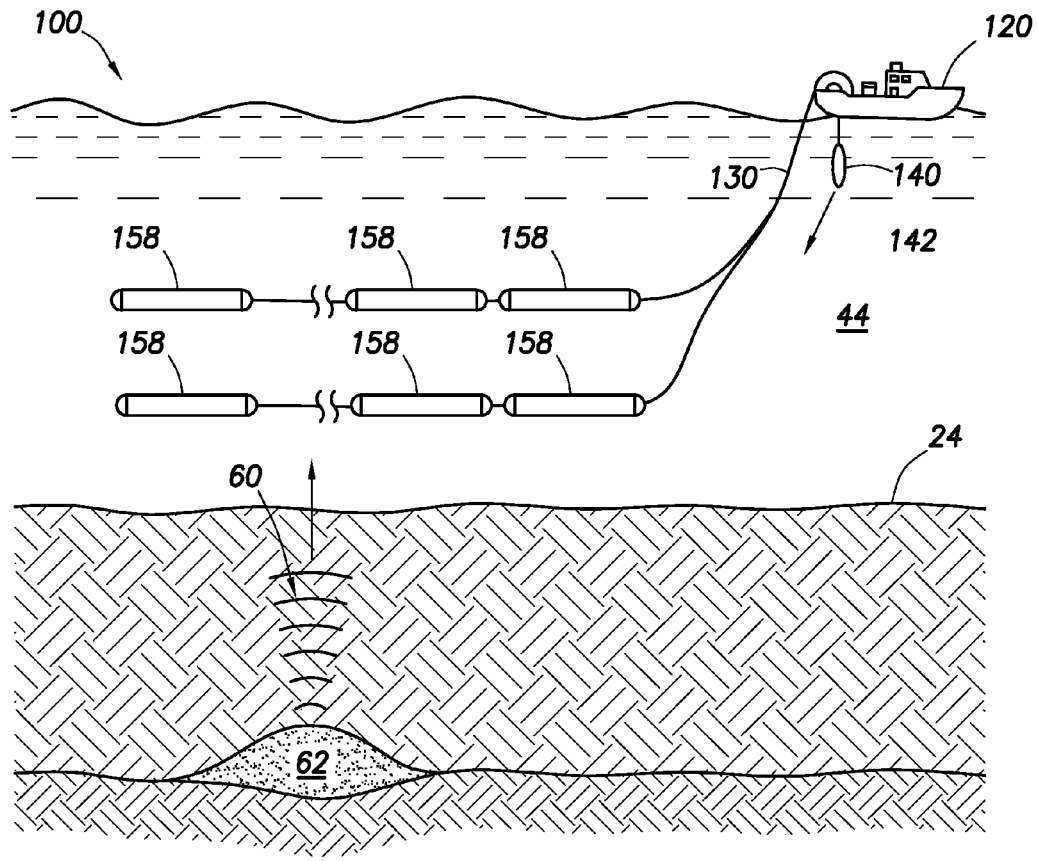
FIG. 3 is a schematic diagram of an example of a marine seismic acquisition system.

Many different types of seismic survey systems may be used to acquire seismic data that contains information regarding the acoustic properties of the seawater. FIG. 3 depicts an example of a towed marine seismic acquisition system 100, although other seismic acquisition systems (seabed acquisitions system, towed acquisition systems that have over/under streamer configurations, etc.) may be used. Typical seismic acquisition systems using frequencies from 1 Hz-500 Hz may be used, however, seismic acquisition systems that use relatively high frequency signals (500 Hz to 10 kHz), which may be quite selective in acquiring seismic data for the purpose of extracting acoustic properties of the seawater, may be used. For the example that is depicted in FIG. 3, a survey vessel 120 tows one or more seismic streamers 130 (tow streamers 130 being depicted in FIG. 3) behind the vessel 120. The streamers 130 may be several thousand meters long and may contain various support cables (not shown), as well as wiring and/or circuitry (not shown) that may be used to support communication along the streamers 130. Each seismic streamer 130 contains seismic sensors 158, which record seismic signals, which are produced due to reflections that are caused in response to acoustic signals 142 that are generated by one or more seismic sources 140 (one seismic source being depicted in FIG. 3).

As an example, the seismic sources 140 may be towed behind the vessel 120 and produce "shots" that are directed through the seawater 44 into the subterranean structure 62. The acoustic signals from the seismic source(s) are typically reflected off the various subterranean geological formations and produce corresponding reflected acoustic signals 60, or pressure waves, which are sensed by the seismic sensors 158. However, the acoustic signals 142 are also reflected from heterogeneities in the seawater. These reflected acoustic signals 60 from heterogeneities in the seawater are influenced by the acoustic properties (such as temperature, salinity and pressure) of the seawater 44, and as described herein, acoustic properties (such as water velocity and density, as examples) may be extracted from the seismic data and used to derive the seawater conductivity.

The seismic data that is gathered in the seismic survey may be processed using seismic data processing techniques that are known to those skilled in the art for purposes of extracting the acoustic properties. More specifically, as an example, the seismic data may be sorted pursuant to a common midpoint (CMP) gather, and a moveout analysis may be formed to estimate acoustic velocities in the water column. The estimated acoustic velocities may be used to correct the moveout of the reflection events in the water column so that the events are aligned in time. At this point, the seismic data is stacked, and a zero offset stacked section is constructed. More advanced processing using, for example, amplitude with variations (AVO) analysis may be performed to refine the estimates of the P-wave impedance constraints and the density contrasts in the water. The moveout velocities, as well as other elastic property estimates, such as densities, may be obtained.

In an example, the seismic data may be processed to obtain a water velocity (called "c") and density (called "p"). The water velocity c and density p estimates may be inverted for temperature (called "T"), salinity (called "S"), and pressure (called "P") using various algorithms, examples of which are described below. The temperature, salinity, and pressure estimates, in turn, are used to derive estimates of the seawater conductivity, according to additional algorithms, examples of which are also set forth below.

The determination of the water velocity c and density p may be evaluated using calibration data. Data that is acquired by disposable or non-disposable probes (as examples) may be used to directly sense the water velocity c and density p at specific points, and the actual values may be compared to the estimated values. If the actual and estimated values do not match, the water velocity c and density p may be re-calculated using different calculation coefficients, assumption, algorithms, etc. When probes are used to gather the calibration data, the probes may be deployed in the seawater column to collect temperature, pressure, and/or salinity data as the probes descend to the sea floor.

In a similar manner, the estimates of the seawater conductivity may be evaluated using calibration data, such as a calibration data derived from disposable or non-disposable probes, which directly measure the seawater conductivity at specific points in the seawater column. If the calibration data does not match the estimated conductivity, the conductivity may be re-calculated using different calculation coefficients, assumptions, algorithms, etc.

Figure 4:
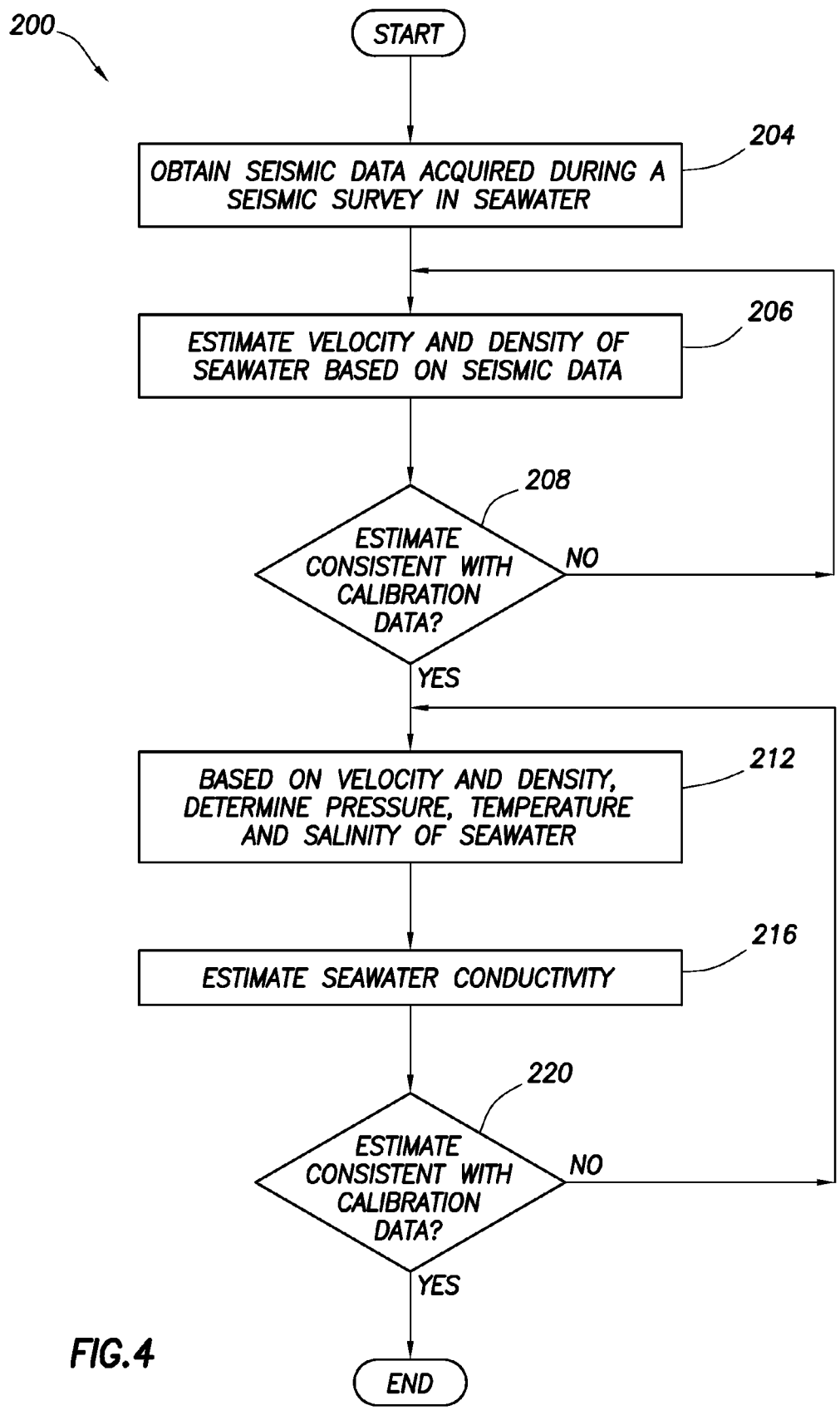

Referring now to FIG. 4, an example is provided of a technique 200 to determine and use seawater conductivity from seismic data. Pursuant to the technique 200, seismic data that was acquired during a seismic survey in seawater is obtained (block 204). Based on the seismic data, acoustic properties, such as the velocity and density of the seawater, are estimated (block 206). A determination (block 208) is made as to whether the estimates of the velocity and density are consistent with calibration data. In other words, calibration data, provided by measurements at specific locations of the velocity and density, may be compared to estimates that are derived from the set of temperature, pressure and/or salinity data. If the estimates do not match, the velocity and density of the seawater is re-estimated, pursuant to block 206. Otherwise, based on the velocity and density, the pressure, temperature and salinity of the seawater is determined, pursuant to block 212.

From the estimated acoustic properties, the seawater conductivity is estimated (block 216). Similar to the comparison of the velocity and density estimates, the estimates of the conductivity may be compared (block 220) with calibration data, such as conductivity data that was obtained from probe-based measurements. If the estimates match with the calibration data, the estimates may be used pursuant to the processing of data obtained in a CSEM survey. Otherwise, the pressure, temperature and salinity and/or the seawater conductivity may be re-estimated. Other variations are possible and are within the scope of the appended claims.

Turning now to the more specific details, the processing flow for obtaining the water velocity c and the density p from the seismic data may involve (as an example) using moveout velocity and reflection amplitudes. The water velocity c and the density p are both functions of the P pressure, T temperature and S salinity. As a more specific example, the velocity c may be described as follows:

$$c(S,T,P) = Cw(T,P) + A(T,P) + B(T,P)S^{3/2} + D(T,P)S^2, \qquad \text{Eq. 1}$$

where the parameters of Eq. 1 are set forth below:

$$Cw(T,P) = \begin{pmatrix} C_{00} + C_{01}T + C_{02}T^2 + \\ C_{03}T^3 + C_{04}T^4 + C_{05}T^5 \end{pmatrix} + \qquad \text{Eq. 2}$$
$$\begin{pmatrix} C_{10} + C_{11}T + C_{12}T^2 + \\ C_{13}T^3 + C_{14}T^4 \end{pmatrix} P +$$
$$\begin{pmatrix} C_{20} + C_{21}T + C_{22}T^2 + \\ C_{23}T^3 + C_{24}T^4 \end{pmatrix} P^2 +$$
$$(C_{30} + C_{31}T + C_{32}T^2)P^3,$$

$$A(T,P) = \begin{pmatrix} A_{00} + A_{01}T + A_{02}T^2 + \\ A_{03}T^3 + A_{04}T^4 \end{pmatrix} + \qquad \text{Eq. 3}$$
$$\begin{pmatrix} A_{10} + A_{11}T + A_{12}T^2 + \\ A_{13}T^3 + A_{14}T^4 \end{pmatrix} P +$$
$$\begin{pmatrix} A_{20} + A_{21}T + A_{22}T^2 + \\ A_{23}T^3 \end{pmatrix} P^2 +$$
$$(A_{30} + A_{31}T + A_{32}T^2)P^3,$$

$$B(T,P) = B_{00} + B_{01}T + (B_{10} + B_{11}T)P, \text{ and} \qquad \text{Eq. 4}$$

$$D(T,P) = D_{00} + D_{01}P. \qquad \text{Eq. 5}$$

In Eqs. 1-5. "T" represents the temperature in degrees Celsius; "S" represents the salinity in practical salinity units in parts per thousand; and "P" represents the pressure in bars.

The coefficients of Eqs. 2-5 are set forth below in Table 1.

TABLE 1

| Coefficient | Value |
|---|---|
| $C_{00}$ | 1402.388 |
| $C_{01}$ | 5.03830 |
| $C_{02}$ | −5.81090E−2 |
| $C_{03}$ | 3.3432E−4 |
| $C_{04}$ | −1.47797E−6 |
| $C_{05}$ | 3.1419E−9 |
| $C_{10}$ | 0.0153563 |

TABLE 1-continued

| Coefficient | Value |
|---|---|
| $C_{11}$ | 6.8999E-4 |
| $C_{12}$ | -8.18293-6 |
| $C_{13}$ | 1.3632E-7 |
| $C_{14}$ | -6.1260E-10 |
| $C_{21}$ | -1.7111E-6 |
| $C_{22}$ | 2.5986E-8 |
| $C_{23}$ | -2.5353E-10 |
| $C_{24}$ | 1.0415E-12 |
| $C_{30}$ | -9.7729E-9 |
| $C_{31}$ | 3.8513E-10 |
| $C_{32}$ | -2.3654E-12 |
| $A_{00}$ | 1.389 |
| $A_{01}$ | -1.262E-2 |
| $A_{02}$ | 7.164E-5 |
| $A_{03}$ | 2.006E-6 |
| $A_{04}$ | -3.21E-8 |
| $A_{10}$ | 9.4742E-5 |
| $A_{11}$ | -1.2580E-5 |
| $A_{12}$ | -6.4885E-8 |
| $A_{13}$ | 1.0507E-8 |
| $A_{14}$ | -2.0122E-10 |
| $A_{20}$ | -3.9064E-7 |
| $A_{21}$ | 9.1041E-9 |
| $A_{22}$ | -1.6002E-10 |
| $A_{23}$ | 7.988E-12 |
| $A_{30}$ | 1.100E-10 |
| $A_{31}$ | 6.651E-12 |
| $A_{32}$ | -3.391E-13 |
| $B_{00}$ | -1.922E-2 |
| $B_{01}$ | -4.42E-5 |
| $B_{10}$ | 7.3637E-5 |
| $B_{11}$ | 1.7950E-7 |
| $D_{00}$ | 1.727E-3 |
| $D_{10}$ | -7.9836E-6 |

Similar relationship also exists between the p density, T temperature, P pressure and S salinity, as set forth below:

$$p(S,T,P)=p(S,T,P)/(1-P/K(S,T,P)), \quad \text{Eq. 6}$$

where "K(S,T,P)" represents the secant bulk modulus, which is related to the secant bulk modulus at P=C by the following relationship:

$$K(S,T,P)=K(S,T,0)+AP+BP^2. \quad \text{Eq. 7}$$

The expression "K(S,T,0)" is described below in Eq. 8:

$$K(S,T,0)=K_w+(f_0+f_1T+f_2T^2+f_3T^3)S+(g_0+g_1T+g_2T^2)S^{3/2}. \quad \text{Eq. 8}$$

Additionally, the terms "A" and "B" of Eq. 7 are set forth below:

$$A=A_w+(i_0+i_1T+i_2T^2)S+i_0S^{3/2}, \text{ and} \quad \text{Eq. 9}$$

$$B=B_w+(m_0+m_1T+m_2T^2)S. \quad \text{Eq. 10}$$

The value "$K_w$," "$A_w$," and "$B_w$" in Eqs. 8-10 for pure water are described below:

$$K_w=e_0+e_1T+e_2T^2+e_3T^3+e_4T^4, \quad \text{Eq. 11}$$

$$A_w+h_0+h_1T+h_2T^2+h_3T^3, \text{ and} \quad \text{Eq. 12}$$

$$B_w+k_0+k_1T+k_2T^2. \quad \text{Eq. 13}$$

The coefficients that appear in Eqs. 8-13 are set forth below in Table 2:

TABLE 2

| Coefficient | Value |
|---|---|
| $f_0$ | 54.6746 |
| $f_1$ | -0.603459 |

TABLE 2-continued

| Coefficient | Value |
|---|---|
| $f_2$ | 1.09987E-2 |
| $f_3$ | -6.1670E-5 |
| $g_0$ | 7.944E-2 |
| $g_1$ | 1.6483E-2 |
| $g_2$ | -5.30093-4 |
| $i_0$ | 2.2838E-3 |
| $i_1$ | -1.0981E-5 |
| $i_2$ | -1.6078E-6 |
| $j_0$ | 1.91075E-4 |
| $m_0$ | -9.9348E-7 |
| $m_1$ | 2.0816E-8 |
| $m_2$ | 9.1697E-10 |
| $e_0$ | 19652.21 |
| $e_1$ | 148.4206 |
| $e_2$ | -2.327105 |
| $e_3$ | 1.360477E-2 |
| $e_4$ | -5.155288 |
| $h_0$ | 3.239908 |
| $h_1$ | 1.43713E-3 |
| $h_2$ | 1.16092E-4 |
| $h_3$ | -5.77905E-7 |
| $k_0$ | 8.50935E-5 |
| $k_1$ | -6.12293E-6 |
| $k_2$ | 5.2787E-8 |

The P pressure may be calculated using the following equation:

$$P(Z,\phi)=P(Z,45)k(Z,\phi), \quad \text{Eq. 14}$$

where the terms "P(Z,45)" and "k(Z,φ)" are described below in Eqs. 15 and 16:

$$P(Z,45)=1_1Z+1_2Z^2+1_3Z^3+1_4Z^4, \text{ and} \quad \text{Eq. 15}$$

$$k(Z,\phi)=(g(\phi)-n_1Z)/(n_0-n_1Z). \quad \text{Eq. 16}$$

In Eq. 16, the "g(φ)" is described as follows:

$$g(\phi)=p_0(1+p_1\sin^2\phi), \quad \text{Eq. 17}$$

In Eqs. 14-17, "g" represents the acceleration due to gravity in meters per second squared; "Z" represents the depth in meters; and "φ" represents the latitude. P(Z,φ) is expressed in bars. Furthermore, the coefficients that are set forth in Eqs. 15-17 are described below in Table 3:

TABLE 3

| Coefficient | Value |
|---|---|
| $I_1$ | 1.000818E-2 |
| $I_2$ | 2.4653-8 |
| $I_3$ | -1.25E-13 |
| $I_4$ | 2.8E-19 |
| $n_0$ | 9.80612 |
| $n_1$ | 2.0E-5 |
| $p_0$ | 9.7803 |
| $p_1$ | 5.3 |

To summarize, three example equations are set forth above for describing p density, velocity c and pressure P. The equations disclosed herein are obtained by empirical fits to experimental data; and they may be inverted numerically to solve for the T temperature and S salinity.

Regarding the estimation of the seawater conductivity, the conductivity depends primarily on temperature, secondarily on salinity and to a negligible extent on pressure. In general, the seawater conductivity may be expressed as follows:

$$\sigma(S,T,P)=\sigma(35,15,0)R, \quad \text{Eq. 18}$$

where the conductivity of standard seawater is as follows:

$$\sigma(35,15,0)=42.914\ mS/cm.$$ Eq. 19

In Eq. 18, "R" may be expressed as follows:

$$R=(sqrt\{(B-Ar_TR_T)^2+4r_TR_TA(B-C)\}-(B-Ar_TR_T\sigma))/2A,$$ Eq. 20 with "A," "B," and "C" are described as follows:

$$A=d_3+d_4T^2,$$ Eq. 21

$$B=1+d_1T+d_2T^2,\ \text{and}$$ Eq. 22

$$C=P(e_1+e_2P+e_3P^2).$$ Eq. 23

The coefficients that appear in Eqs. 21-23 are described below Table 4:

TABLE 4

| Coefficients | Value |
| --- | --- |
| $d_1$ | 3.426E−2 |
| $d_2$ | 4.464E−4 |
| $d_3$ | 4.215E−1 |
| $d_4$ | −3.107E−3 |
| $e_1$ | 2.070E−5 |
| $e_2$ | −6.370E−10 |
| $e_3$ | 3.989-15 |

A simplified expression for the conductivity, which is independent of the salinity and pressure may alternatively be used:

$$\sigma=3.0+T/10.0,$$ Eq. 24 where "T" is in degrees Celsius, and the conductivity is in Siemens (S) per meter (S/m).

After the temperature, salinity, pressure profiles, cross-sections and maps from the seismic data are obtained, the desired conductivity profiles, cross-sections, and maps are generated to correct, or compensate for, and properly interpret the CSEM data.

Figure 5:
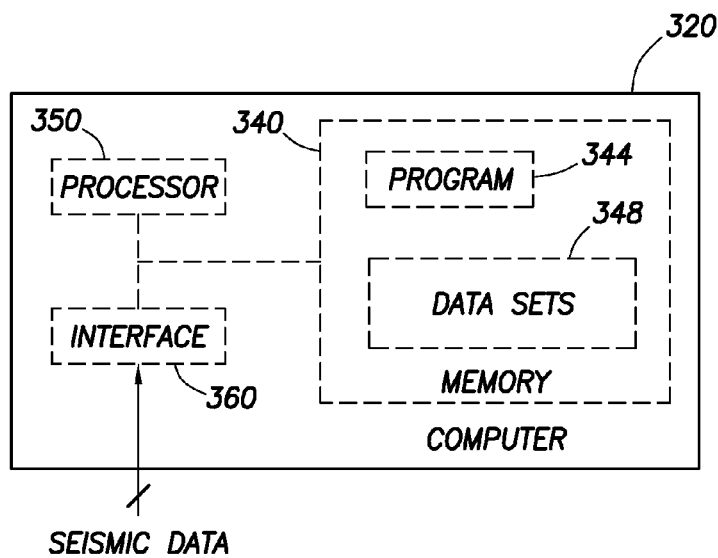
FIG. 5 is a schematic diagram of an example of a data processing system.

Referring to FIG. 5, an example of a seismic data processing system 320 may be used to perform at least some portions of the techniques that are disclosed herein for one or more of the following purposes: estimating acoustic properties of seawater from seawater; calibrating the acoustic property estimation; estimating seawater conductivity from the acoustic property estimates; calibrating the seawater conductivity estimation; and compensating for, or correcting, CSEM survey data based on the conductivity estimates. In accordance with some embodiments of the invention, the system 320 may include a processor 350, such as one or more microprocessors and/or microcontrollers.

The processor 350 may be coupled to a communication interface 360 for purposes of receiving seismic data, calibration data, algorithm parameters, acoustic properties, previous estimations, time lapse data, etc. Thus, in accordance with embodiments of the invention described herein, the processor 350, when executing instructions stored in a memory of the seismic data processing system 320, may receive any part of all the data.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320. The memory 340 may store, for example, various data sets involved with the techniques that are described herein, as indicated by reference numeral 348. Additionally, the memory 340 may store program instructions 344, which when executed by the processor 350, may cause the processor 350 to perform one or more of the techniques that are disclosed herein. The system 320 may also include a display (not shown) to graphically depict estimations, graphs, charts, images, etc., which are produced by execution of the program instructions 344. For example, the display may graphically display a screen image of estimated acoustic properties of seawater, seawater conductivity, different images showing differences between a base survey and a monitor survey, calibration values (of seawater conductivity and acoustic properties), comparisons of calibration data with estimated values, etc.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   obtaining acoustic reflection data, such as that acquired during a seismic survey in the seawater;
   based on the acoustic reflection data, determining a conductivity of the seawater; and
   processing data obtained from an electromagnetics-based survey based on the determined conductivity.

2. The method of claim 1, wherein the electro-mnagnetics based survey comprises a controlled source electromagnetics survey.

3. The method of claim 1, wherein the act of determining the conductivity comprises determining elastic properties of the seawater.

4. The method of claim 3, wherein the elastic properties comprise a velocity.

5. The method of claim 3, wherein the elastic properties comprise a density.

6. The method of claim 3, wherein the act of determining the elastic properties comprise determining spatially varying elastic properties.

7. The, method of claim 3, wherein the act of determining the elastic comprises determining temporally varying elastic properties.

8. The method of claim 3, further comprising evaluating the determination of the elastic properties based on calibration data.

9. The method of claim 1, wherein the act of determining the conductivity comprises determining a temperature of the seawater.

10. The method of claim 1, wherein the act of determining the conductivity comprises determining a pressure of the seawater.

11. The method of claim 1, wherein the act of deterniIning the conductivity comprises determining a salinity of the seawater.

12. The method of claim 1, further comprising processing data obtained in a controlled source electromagnetic survey based at least in part on the determined conductivity.

13. The method of claim 1, further comprising evaluating the determined conductivity based on calibration data.

14. A system comprising:
an interface to receive seismic data. acquired during a seismic survey in seawater; and
a processor to determine a conductivity of the seawater based on the seismic data.

15. The system of claim 14, wherein the processor is adapted to determine elastic properties of the seawater.

16. The system of claim 15, wherein the elastic properties include n velocity.

17. The system of claim 15, wherein the elastic properties comprise a density.

18. The system of claim 14, wherein the processor is adapted to determine a temperature, pressure or salinity of the seawater based on the seismic data.

19. The system of claim 14, fruther comprising:
a surface vessel; and
at least one sensor towed by the survey vessel to obtain the seismic data.

20. The system of claim 14, further comprising:
a survey vessel; and
at least one sensor towed by the survey vessel to obtain controlled source electromagnetic data.

21. The system of claim 14, wherein the processor is adapted to provide an indication of an evaluation of the determined conductivity based on calibration data.

22. An article comprising a computer accessible storage medium to store instructions that when executed cause a processor-based system to: obtain seismic data acquired during a seismic survey in seawater; and based on the seismic data, determine a conductivity of the seawater.

23. The article of claim 22, the storage medium comprising instructions that when executed cause the processor-based system to determine elastic properties of the seawater based on the seismic data.

24. The article of claim 23, the storage medium storing instructions that when executed by the processor-based system cause the processor-based system to determine spatially varying elastic properties of the seawater based on the seismic data.

25. The article of claim 23, the storage medium storing instructions that when executed by the processor-based system cause the processor-based system to determine temporally varying elastic properties of the seawater based on the seismic data.

* * * * *